United States Patent
Weyn et al.

(10) Patent No.: US 11,236,843 B2
(45) Date of Patent: Feb. 1, 2022

(54) MONITORING AN OPERATING STATE OF A VALVE

(71) Applicants: UNIVERSITEIT ANTWERPEN, Antwerp (BE); IMEC VZW, Leuven (BE); ALOXY NV, Antwerp (BE)

(72) Inventors: Maarten Weyn, Hove (BE); Jan Coppens, Merelbeke (BE)

(73) Assignees: UNIVERSITEIT ANTWERPEN, Antwerp (BE); IMEC VZW, Leuven (BE); ALOXY NV, Antwerp (BE)

( * ) Notice: Subject to any disclaimer, the term of this patent is extended or adjusted under 35 U.S.C. 154(b) by 0 days.

(21) Appl. No.: 16/981,392

(22) PCT Filed: Mar. 8, 2019

(86) PCT No.: PCT/EP2019/055817
§ 371 (c)(1),
(2) Date: Sep. 16, 2020

(87) PCT Pub. No.: WO2019/179788
PCT Pub. Date: Sep. 26, 2019

(65) Prior Publication Data
US 2021/0003231 A1   Jan. 7, 2021

(30) Foreign Application Priority Data
Mar. 19, 2018 (EP) .................... 18162598

(51) Int. Cl.
*F16K 37/00*  (2006.01)
*F16K 31/60*  (2006.01)
*G01D 5/14*   (2006.01)

(52) U.S. Cl.
CPC .......... *F16K 37/0041* (2013.01); *F16K 31/60* (2013.01); *F16K 37/0083* (2013.01); *G01D 5/145* (2013.01); *Y10T 137/8242* (2015.04)

(58) Field of Classification Search
CPC .. F16K 31/60; F16K 37/0033; F16K 37/0041; F16K 37/0083; G01D 5/145; Y10T 137/8242
See application file for complete search history.

(56) References Cited

U.S. PATENT DOCUMENTS

| 5,504,426 A | 4/1996 | Ricci et al. |
| 7,784,490 B1 * | 8/2010 | Stewart ............... F16K 37/0041 137/556 |

(Continued)

FOREIGN PATENT DOCUMENTS

| EP | 0253954 A1 | 1/1988 |
| EP | 2126434 B1 | 8/2011 |

(Continued)

OTHER PUBLICATIONS

International Search Report and Written Opinion from PCT Application No. PCT/EP2019/055817, dated Mar. 29, 2019.

(Continued)

*Primary Examiner* — Atif H Chaudry
(74) *Attorney, Agent, or Firm* — Workman Nydegger

(57) ABSTRACT

A device is configured to monitor a state of a rotatable handle of a valve when the device is attached to the rotatable handle. The device comprises a vector magnetometer configured to measure a magnetic field. The device comprises a processing unit configured to obtain from the vector magnetometer measurements of the magnetic field when the handle is rotated; calculate a change in the state of the rotatable handle based on a difference between the measurements of the magnetic field; and report the change in the state.

14 Claims, 8 Drawing Sheets

(56) References Cited

U.S. PATENT DOCUMENTS

| | | | |
|---|---|---|---|
| 2003/0033867 A1* | 2/2003 | Posey | F16K 37/0041 |
| | | | 73/168 |
| 2004/0060603 A1* | 4/2004 | Song | G01F 1/115 |
| | | | 137/554 |
| 2005/0279961 A1 | 12/2005 | Royse | |
| 2006/0289343 A1* | 12/2006 | Schmitt | C02F 9/005 |
| | | | 210/85 |
| 2012/0310139 A1 | 12/2012 | Murphy | |
| 2013/0172769 A1* | 7/2013 | Arvind | A61B 5/1116 |
| | | | 600/534 |
| 2013/0321166 A1 | 12/2013 | Gritzo et al. | |
| 2014/0034029 A1 | 2/2014 | Sasaki et al. | |
| 2016/0167706 A1* | 6/2016 | Van Meijl | B62D 11/003 |
| | | | 701/41 |
| 2017/0275860 A1 | 9/2017 | Beck | |
| 2020/0132217 A1* | 4/2020 | Gismervik | F16K 37/0041 |

FOREIGN PATENT DOCUMENTS

| | | |
|---|---|---|
| EP | 3064816 A1 | 9/2016 |
| JP | 2016075362 A | 5/2016 |
| NO | 20170634 A1 | 10/2018 |
| WO | 2018193058 A1 | 10/2018 |

OTHER PUBLICATIONS

Extended Search Report from corresponding EP Application No. EP18162598.9, dated Aug. 1, 2018.

\* cited by examiner

MONITORING AN OPERATING STATE OF A VALVE

FIELD OF THE INVENTION

The present invention generally relates to the field of devices and methods for monitoring operating states of valves suitable for controlling processes in an industrial facility.

BACKGROUND OF THE INVENTION

A valve is a device that regulates a flow of a fluid, such as gases or liquids, by opening or closing various passageways, or a part thereof, in industrial processes, such as ones in petrochemistry, pharma and the wider industry. Generally, industrial processes require a multitude of valves in different sizes and shapes, and are deployed on a large scale.

Safety regulations in industry demand periodically inspections of operating positions of the valves, thus controlling if the valves are positioned in an open, a closed, or an intermediate state. These inspections may be performed manually by operators, yet since such inspections are labour-intensive and error-prone, solutions for remotely monitoring the state of a valve have been proposed.

To remotely monitor manually operating valves, a valve position indicator may be installed between a valve's stem as, for example, disclosed in EP3064816A1. The valve position indicator is installed between the rotatable handle of the valve on one side, and the stem or spindle, on the other side. Yet, firstly the valve needs to be dismantled to install the valve position indicator, which may result in damages, and, secondly, the valve needs to be suitable to house such an indicator. The height of the housing of the indicator itself may, for example, hinder to completely set the valve in a closed state. Furthermore, the valve's type needs to be suitable to the functioning of such an indicator, which is, for example, not the case when a ball valve needs to be monitored.

Another approach to monitor a valve's operating state is disclosed in EP2126434B1. Herein, according to embodiments thereof, an angular position of the valve is monitored through, for example, in a first solution an optically based sensor, or in a second solution through a Hall device. In the first solution a U-shaped profile is affixed to the valve's stem, while in the second one, a permanent magnet needs to be installed. Thus, again, in both solutions, the valve needs to be disassembled and the valve's stem needs to be suitable for affixing these components.

SUMMARY OF THE INVENTION

It is an object of the present invention to alleviate the above drawbacks and to provide an improved solution for monitoring an operating state of a manual valve without disassembling it while at the same time no restrictions are imposed by the type and/or size of the valve and/or its stem.

This object is achieved, in a first aspect, by a device configured to monitor a state of a rotatable handle of a valve when the device is attached to the rotatable handle, the device comprising a vector magnetometer configured to measure a magnetic field; the device further comprising a processing unit configured to:
obtain from the vector magnetometer measurements of the magnetic field when the handle is rotated;
calculate a change in the state of the rotatable handle based on a difference between the measurements of the magnetic field; and
report the change in the state.

The device may thus be attached to the rotatable handle of the valve by attaching means, such as, for example, a strap, by a housing of the device itself which is shaped such that it may be clamped, by a combination thereof or any other attaching mean suitable to attach the device to the rotatable handle.

The device comprises a vector magnetometer. Such a magnetometer not only measures a total strength of a magnetic field, but also has the capability to measure one or more components of a magnetic field in a particular direction, relative to the spatial orientation of the device. The magnetometer thus measures a vectorial magnetic field in a one-dimensional, thus its magnitude and direction, in a two-dimensional or in a three-dimensional space.

Next, when the handle is rotated, the processing unit obtains from the vector magnetometer measurements. In other words, for different positions of the rotatable handle, corresponding magnetic fields are measured and obtained by the processing unit. Next, based on these measurements of the different positions, and more in particular on difference between the measurements, the processing unit calculates a change in the state of the rotatable handle. Finally, the processing unit reports the change in the state.

Since the device is attached directly to the handle through attaching means, there is no need to disassemble the valve and/or its stem. Furthermore, there are no restrictions on the type of valve. The handle, which is used to manually control the valve, may comprise any type of shape, such as a handwheel, or a lever handle when the device is attached to a ball valve.

Secondly, since the Earth's magnetic field is omnipresent, no reference is needed, thus the device may be installed in a straightforward manner and is immediately ready for use. By measuring the vectorial magnetic field, thus its strength and direction, in different positions, the processing unit may calculate the change of state in a plain manner, without the need of performing complex calculation or signal processing.

Thirdly, when the handle is rotated, a change in the state of the valve occurs, which will thus be identified by the device and instantly reported. The reported change in the state may, thus, indicate if the valve is positioned in an open, a closed, or an intermediate state. In this way, a clear indication is given on the operating position of the valve.

The calculating of the change further comprises, according to an embodiment, calculating an angle of rotation of the rotatable handle between the measurements.

In other words, the processing unit may further calculate an angle of rotation based on a difference between measured magnetic fields. In this way, the change in the state may further be linked to the angle of rotation of the rotatable handle.

Additionally, the processing unit is further configured to calculate a total angle of rotation form the start to the end of the rotation as the change in the state. This means that, by calculating the total angle of rotation, an even more accurately monitoring of the state is performed, since the total angle of rotation may further be linked to the type of valve that is operated. For example, for a regular ball valve, a change in the state is normally achieved by a rotation of ninety or hundred and eighty degrees, while for a valve operated by a handwheel more than one complete turn of the wheel may be needed to change a state. The total angle of rotation may be reported by the device, such that accurate decisions may be deduced therefrom.

According to an embodiment, the calculating further comprises, when obtaining a new measurement:
 determine a new centre of rotation of the rotatable handle between the new measurement and a previous measurement;
 update a mean centre of rotation based on the new centre of rotation;
 correct the calculated angle of rotation based on the updated mean centre of rotation.

Thus, initially, since the processing unit calculates an angle of rotation between two measurements, for example, from a first and a second position of the handle, an initial centre of rotation may be identified related to this angle of rotation. When a new measurement is obtained, for example from a third position, again, a new centre of rotation may be identified or determined related to the angle of rotation from the second to the third position. Next, based on the initial centre of rotation and the new centre of rotation, a mean centre of rotation is determined, thus an average value between the two mean centres of rotation. Subsequently, the calculated angle of rotation is then based on the mean centre of rotation by correcting it. Furthermore, for each obtained new measurement, a new centre of rotation may be determined, and the mean centre of rotation is again updated. In this way through each new measurement, the centre of rotation is determined more precisely, such that the change in state of the valve is identified more precisely as well.

When no interference sources, from the point of view of magnetic fields, are present in the environment of the device, the centre related to the angle of rotation, as calculated through the measurements of the magnetic field will correspond to the centre of rotation of the rotatable handle. However, due to interference sources, when present, the calculated centre of rotation may drift away with respect to the centre of rotation of the rotatable handle. Interference sources may be electrical devices emitting magnetic fields, power cables, but also the presence of conductive material which influence the magnetic field in the proximity of the device. An effect therefrom is that, when the magnetic field is measured when rotating the handle, the calculated angle of rotation does not correspond to a part of a circle, but to a part of an ellipse shape. The effects originating from interference sources are also specified as hard-iron offsets and/or soft-iron effects.

A hard-iron offset is a fixed magnetic offset added to the Earth's magnetic field and originates from devices and/or wires that produce a magnetic field themselves. A soft-iron effect or soft-iron distortion originates from external materials that influence or distort the magnetic field due to their conductivity but that do not generate magnetic field themselves. Yet, although these effects are present, they remain stable if the surrounding environment is stable.

Thus, by repeatedly updating the mean centre of rotation with each new measurement, the environment is taken into account, and the device is calibrated. Consequently, instead of the ideal circle shape, the calculations are performed with, for example, an ellipse shape, such that, in this way, the calculations are more accurately and correspond to the real-life situation. The calculated angle of rotation is then corrected based on the updated mean centre of rotation.

The calculating further comprises, according to an embodiment, when obtaining the new measurement, update an accumulating angle of rotation with the corrected angle of rotation.

In other words, each time a new measurement is obtained, the mean centre is updated, the calculated angle of rotation corrected, and subsequently, an accumulated angle of rotation is updated with the corrected angle of rotation. The accumulated angle of rotation thus corresponds to the sum of each corrected calculated angle of rotation. In this way, the accumulated angle of rotation is calculated by considering the ellipse shape, and thus the environment as well.

According to an embodiment, the total angle of rotation corresponds with the accumulating angle of rotation.

Advantageously, the total amount of rotations of the rotatable handle may be reported, such that the operating state of the valve may be determined in an elaborated manner.

According to an embodiment, the device further comprises a wireless interface; and the processing unit is further configured to report the change in the state by the wireless interface.

The wireless interface may be configured to transmit a report using long-range communication, e.g. according to the LoRaWAN Low Power Wide Area Network (LPWAN) specification, the Sigfox Low Power Wide Area Network specification or the DASH7 Alliance Protocol (D7A). Alternatively, short-range communication protocols may be used, e.g. using Bluetooth, Wi-Fi and/or Zigbee, or any other wireless technology standard suitable to wirelessly report the change in the state.

An advantage is that the change in the state may be monitored remotely and that a plurality of states of different valves and attached devices thereon may be collected in a central place, like, for example, a control room.

According to an embodiment, the device further comprises a battery; and the processing unit is further configured to set the device in a low-power sleep mode when the rotatable handle is not rotated; and the device further comprises an accelerometer configured to instruct the processing unit to wake up the device when the handle is rotated.

The device may thus be operated by a battery. An advantage is that no additional wiring is needed to provide power to the device. Since there is no wiring, it is further an advantage that the device may easily be attached to the handle. Next, when the handle is standing still, thus not rotating, the processing unit instructs to set the device in a low-power sleep mode, or in a hibernate mode. In this way, the battery power is saved, and the battery life is prolonged. Furthermore, the device comprises an accelerometer configured, when the handle is rotated again after standing still, to instruct the processing unit to wake up the device such that the measurements and the monitoring continues. In this way, the device does not be triggered unnecessary on predefined time periods but is only triggered if a movement is detected.

According to an embodiment, the device further comprises an inputting means configured to manually instruct the processing unit to initialize the state.

This way, when the device is attached to the handle, the state can be set at the state corresponding to that wherein the valve is positioned when attaching the device. Advantageously, a reported change in the state may immediately be linked to the initial state. The reporting of the state may thus correspond to the state itself, when no change of the state is calculated.

According to an embodiment, the processing unit is further configured to:
 obtain from a fixed reference beacon measurements of a reference magnetic field;

and wherein the calculating of the change is further compensated by the reference magnetic field.

In the proximity of the device, a reference beacon is installed with a fixed distance to the valve which is monitored by the device. From this fixed reference beacon, the device obtains magnetic field measurements, which are used as a reference magnetic field. This implies that, in the calculations performed by the processing unit the calculations are compensated by the reference magnetic field.

When a valve is monitored which is located on a moving platform, such as on, for example, a drilling platform, or on a boat, the vector magnetometer measures a changing magnetic field while the state of the valve is not changed at all. By using a reference magnetic field, the device is thus also suitable to be used in an environment that moves relative to the Earth's magnetic field.

Alternatively, the processing unit is further configured to:
 obtain from at least one other device according to the first aspect of the invention measurements of the magnetic field;
 derive a reference magnetic field based on the obtained measurements of the device and the at least one other device;
 and wherein the calculating of the change is further compensated by the reference magnetic field.

Thus, instead of using a reference magnetic field obtained from a fix reference beacon, a group of devices exchange measurements of the magnetic fields, such that each device separately may derive therefrom a reference magnetic field, or, wherein a reference magnetic field is derived by the group of devices and exchanged over the devices.

According to a second aspect, the disclosure relates to a valve comprising a device according to the first aspect.

Instead of attaching the device to a rotatable handle of a valve, the device may also be incorporated in the valve itself, for example in the handle.

According to a third aspect, the disclosure relates to a method for monitoring a state of a rotatable handle of a valve, the method comprising the steps of:
 obtaining from a device attached to the rotatable handle comprising a vector magnetometer, measurements of a magnetic field when the handle is rotated;
 calculating a change in the state of the rotatable handle based on a difference between the measurements of the magnetic field; and
 reporting the change in the state.

According to a fourth aspect, the disclosure relates to a computer program product comprising computer-executable instructions for performing the method according to the third aspect when the program is run on a computer.

According to a fifth aspect, the disclosure relates to a computer readable storage medium comprising the computer program product according to the fourth aspect.

DETAILED DESCRIPTION OF
EMBODIMENT(S)

Figure 1:
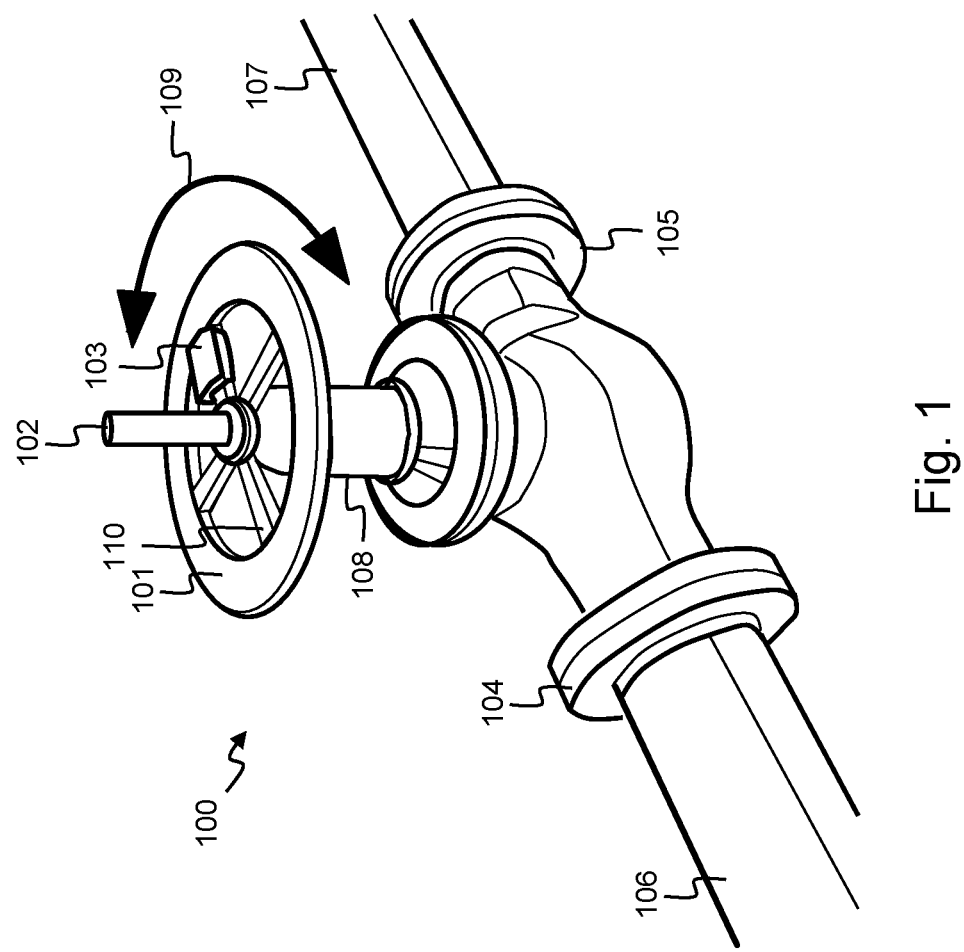
FIG. 1 illustrates a valve comprising a rotatable handle and a device for monitoring the state of the rotatable handle according to an embodiment of the invention.

FIG. 1 illustrates a valve suitable for controlling processes in an industrial facility. The valve 100 comprises a rotatable handle 101, rotatable along a centre of rotation 102, a stem 108, and two ports 104 and 105. The valve 100 controls a flow of a fluid, such as gases or liquids, from pipeline 106 to pipeline 107 or vice versa. Controlling a flow is to be understood that the valve 100 regulates a fluid flow between the ports 104 and 105 by opening, closing or partially obstructing a passageway between them. The controlling is executed by rotating 109 the rotatable handle 101 over an angle of rotation. When rotating 109 the handle 101, the state of the valve 100 varies from an open to a closed state, with intermediate states in between, or vice versa.

Figure 2:
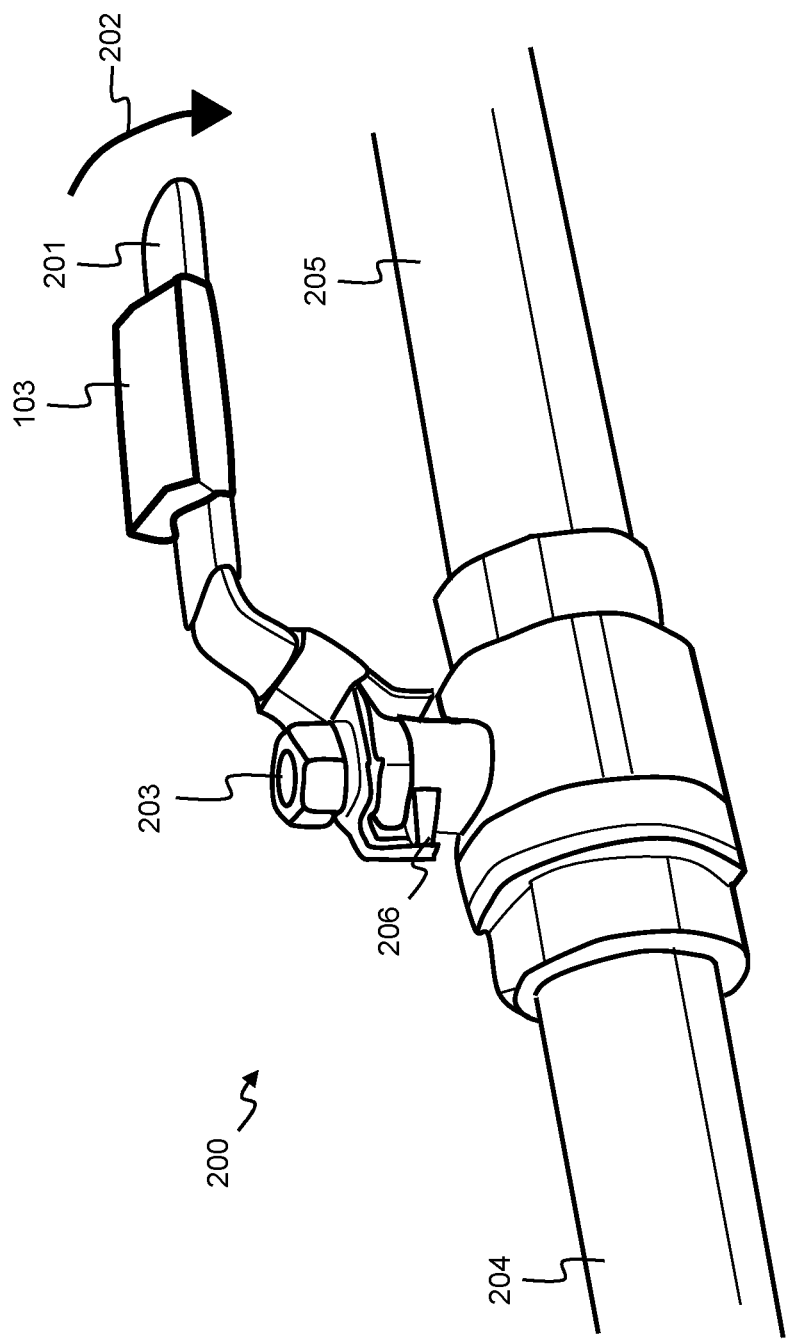
FIG. 2 illustrates a ball valve comprising a lever handle and a device for monitoring the state of the lever handle according to an embodiment of the invention.

FIG. 2 illustrates another type of valve, a ball valve, which is also suitable for controlling processes in an industrial facility. The ball valve 200 controls a flow of a fluid between pipelines 204 and 205. The controlling of the fluid flow is performed by rotating 202 the lever handle 201 along its centre or rotation 203. Whereas for valve 100 the rotatable handle 101 may be rotated 109 a number of turns around its centre of rotation 102, the lever handle 201 of ball valve 200 may be rotated 202 at the utmost three hundred and sixty degrees since the lever handle 201 is blocked by cap 206 which prevents the lever handle 201 to be further rotated around the centre of rotation 203 after one turn. The angle of rotation of a ball valve such as 200 may also be limited to hundred and eighty degrees or even ninety degrees, depending on the type of ball valve.

Both valves 100 and 200 are valves that are manually operated. Thus, an operator in the industrial facility may change the state of the valves 100 and 200 by turning their respective handle 101 and 201. In an industrial facility, a multitude of valves are present and in practice an operator changes the states of the valves following a particular procedure, for example via instruction listed in a scheme. To monitor a state of a rotatable handle of a particular valve, a device as illustrated in FIG. 5 is utilized.

Figure 4:
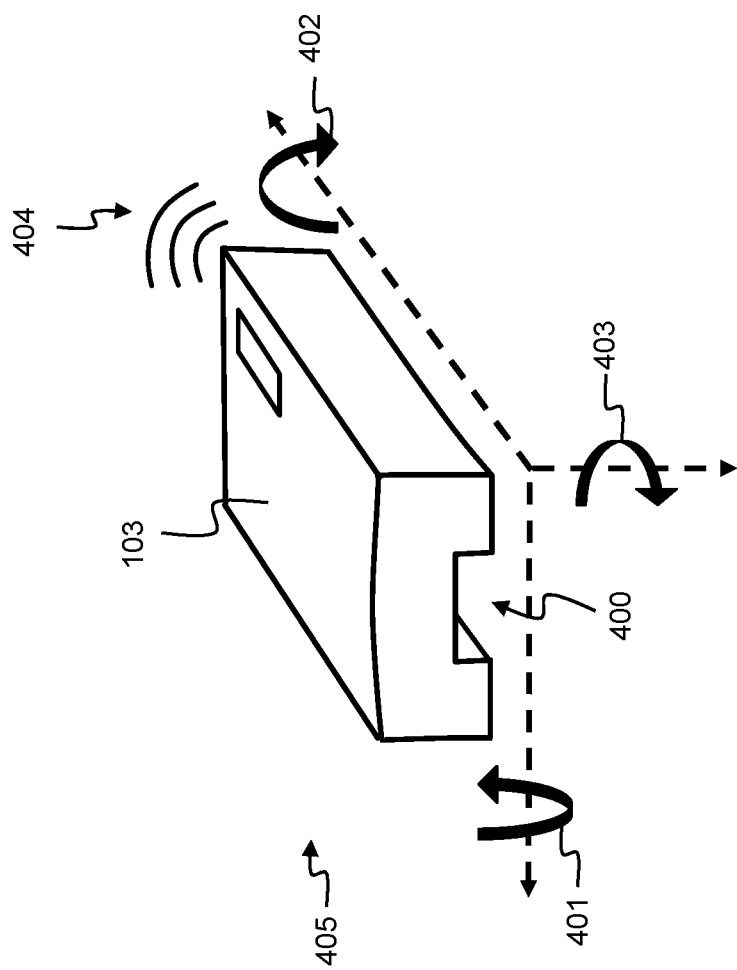
FIG. 4 illustrates a housing of a device comprising a vector magnetometer according to an embodiment of the invention.
Figure 5:
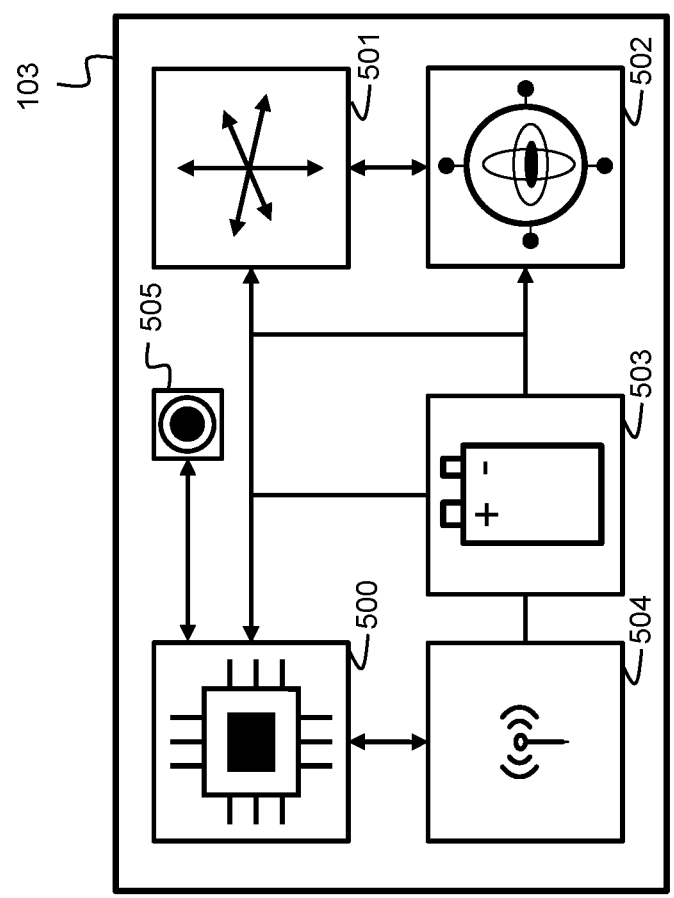
FIG. 5 illustrates a device comprising a processing unit, a wireless interface, a battery, a magnetometer, an accelerometer and an inputting means according to an embodiment of the invention.

The device 103 illustrated in FIG. 5 comprises a processing unit 500, a vector magnetometer 501, an accelerometer 502, a battery, 503, a wireless interface 504 and an inputting means 505. The components may, according to an embodiment, be incorporated in a housing as illustrated in FIG. 4. The wireless interface may support long-range wireless communication, e.g. according to the LoRaWAN Low Power Wide Area Network (LPWAN) specification, the Sigfox Low Power Wide Area Network specification or the DASH7 Alliance Protocol (D7A). The wireless interface may also support short-range communication, e.g. Bluetooth, Wi-Fi and/or Zigbee.

The housing 405 illustrated in FIG. 4 comprises a notch 400 shaped in such a way that it fits to the lever handle 201 of ball valve 200 by clamping the device 103 on the lever handle 201. The device 103 may also be clamped on a bar or rod 110 of the rotatable handle 101 of the valve 100. It should further be clear to the skilled person that the shape of the notch 400 may be adapted to the type and size of the valve on which it is attached, and more in particular its handle. Moreover, other attaching means may be used to attach the device 103 to a valve, such as one or more straps, adhesive tape, suture material, glue, screws, any other attaching mean suitable attach the device 103 to a handle, and in any combination of such means.

The device 103 is thus attached is such a way that there is no relative movement of the device 103 with respect to the rotatable handle 101 when operating the valve 100. Preferably, the device 103 is also attach in such a way that an operator may change a state of the valve 100 without a need to touch the device 103.

As further illustrated in FIG. 1 and FIG. 2, the device 103 is attachable to the rotatable handle, 101 of valve 100 and the lever handle 201 of ball valve 200. In the further continuation, the invention will be illustrated by referring to FIG. 1, but it should be understood that a same reasoning applies, mutatis mutandis, for the ball valve illustrated in FIG. 2.

Thus, the device 103 may be attached to a rod 110 of the rotatable handle 101 of valve 100. Next, the vector magnetometer 501 of the device 103 is configured to measure a magnetic field and its direction. In a one-dimensional space, this corresponds to the strength of the magnetic field and its direction, in a two-dimensional space this corresponds to the magnetic field in, for example, a xy-coordinate system, and in a three-dimensional space this corresponds to the magnetic field in, for example, a xyz-coordinate system. Obviously, other coordinates systems may be used as well, such as polar or cylindrical coordinate systems.

When the device 103 is attached to the rotatable handle 101 of valve 100, the device 103 may pitch 401, roll 402, yaw 403 or any combination thereof, when the rotatable handle 101 is rotated 109. Since the device 103 is attached to the handle 101, these movements are indicative for a change of the state of the valve 100. The movements are derived by measuring the magnetic field at different positions of the devices 103.

Figure 6:
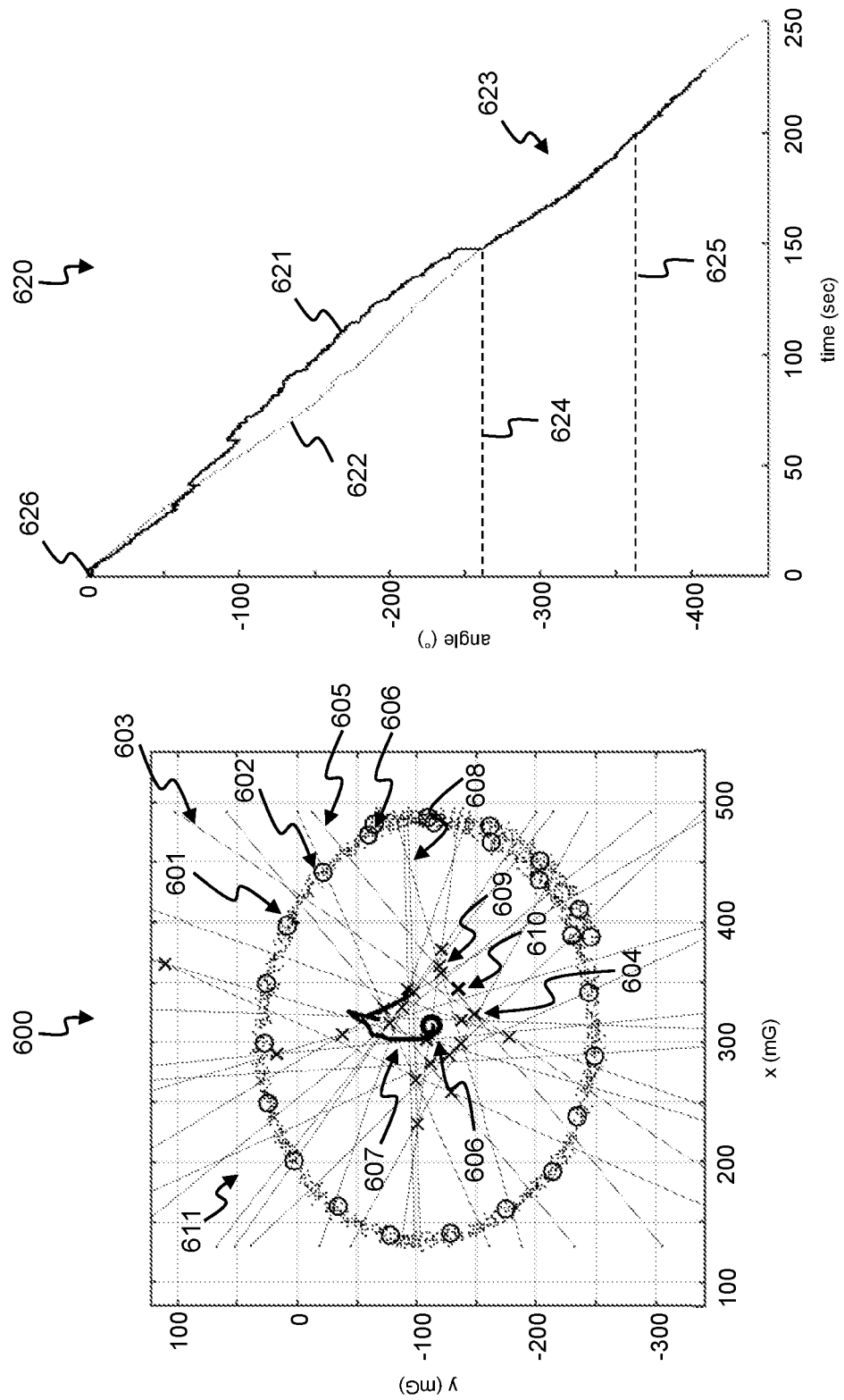
FIG. 6 illustrates a plot of measured magnetic fields and calculated angles of rotations according to an embodiment of the invention.
Figure 7:
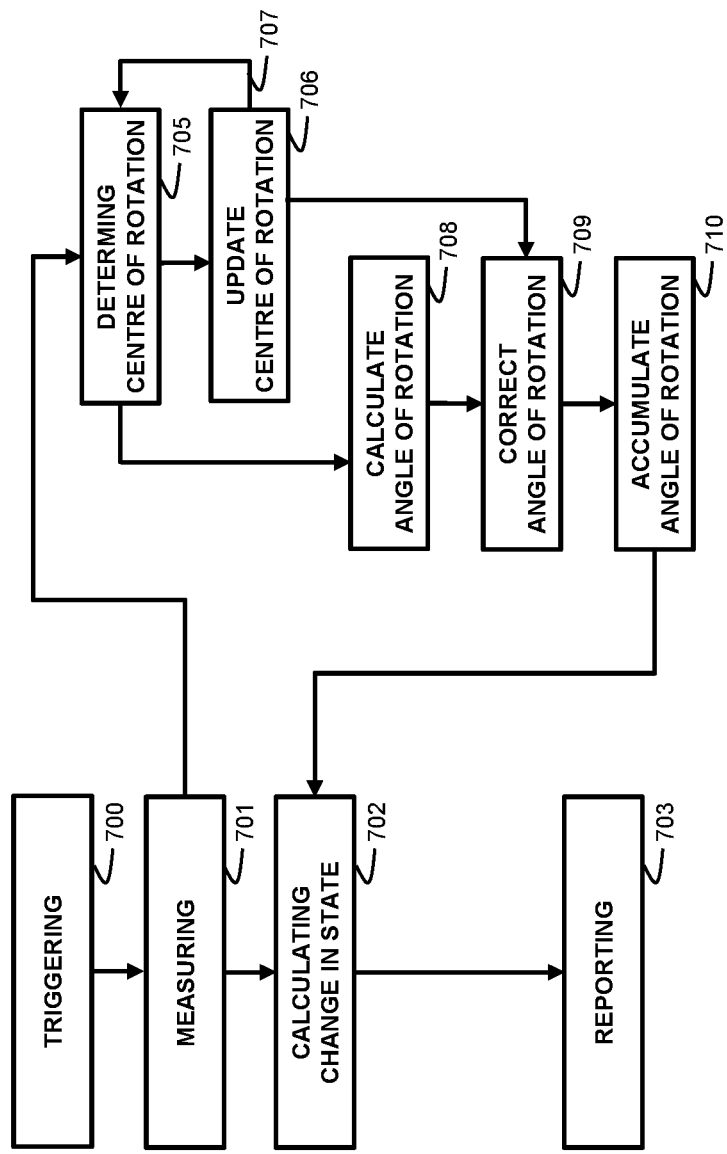
FIG. 7 illustrates steps performed to monitor a state of a rotatable handle of a valve according an embodiment of the invention.

In a first step, according to an illustrative embodiment of the invention, and further illustrated in FIG. 7, the device 103, and more in particular the magnetometer 501 thereof, is triggered 700. The triggering 700 is executed by the accelerometer 502 when a motion of the rotatable handle 101 is detected. Next, for a first position, the magnetometer 501 measures 701 a magnetic field, and since the rotatable handle 101 is rotated 109, a magnetic field is measured 701 for a second and third position as well. The magnetometer 501 measures 701 the magnetic fields in, for example, one, two or three axes. The measurements may be further plotted in a graph, as illustrated in FIG. 6, as illustration of calculating 702 a change in the state. The graph 600 comprises xy-coordinates 601 of the first measurement from the first position, xy-coordinates 602 of the second measurements from the second position, and xy-coordinates 606 of the third measurements from the third position. The xy-coordinates are, for example, expressed in milligaus. It should be further understood that the xy-coordinates may originate from three-dimensional measured magnetic fields, which are subsequently projected in a xy-plane. A xy-plane may correspond, for example, to a plane defined by the outer contact surface, which correspond to a circle, of the rotatable handle 101.

In a distortion free environment from the point of view of magnetic fields, the plotted points would ideally correspond to a part of a circle when represented in a graph. Yet, to take into account the environment, and more in particular the hard-iron offsets and/or soft-iron effects as already discussed, an initial centre of rotation of the curve between the first point 601, the second point 602 and the third point 606 is determined 705.

First, a first division line 603 between points 601 and 602 is calculated. Next, a second division line 605 between points 602 and 606 is calculated as well. Subsequently, an initial centre of rotation 604 is determined 705 as the intersection point between the first division line 603 and the second division line 605. Since this is the initial calculated centre of rotation 604, there is no needs to update 706 the centre of rotation.

Next, the determination 705 of a centre of rotation by measuring 701 is repeated 707. For example, a new centre of rotation 609 is determined 705 as the intersection between division line 605 and division line 608. Next, the centre of rotation is updated 706 with a new centre of rotation 610 as a mean centre of rotation with respect to centre of rotation 604 and centre of rotation 609. Thus, for each new measurement 701, the determining 705 is repeated 707, such that the updated 706 centre of rotation converges 607 to the centre of rotation 606. This centre of rotation 606 corresponds to the centre of rotation of the ellipse shape 611, wherein the hard-iron offsets and/or soft-iron effects are manifested, thus to the real-life situation.

Since a centre of rotation is determined 705, an angle of rotation may be calculated 708 therefrom. For example, for the points 601, 602, and 606, an angle of rotation is calculated 708 based on the centre of rotation 604. Each time the centre of rotation is updated 706, the calculated 708 angle of rotation is corrected 709 using the updated 706 centre of rotation, and further accumulated 710. The accumulated 710 angle of rotation, each time corrected 709, may also be plotted as a function of time wherein the measurements are performed as illustrated in 620.

Illustration 620 corresponds to an accumulated 710 angle of rotation reported 703 over time, for example express in seconds, thus with a centre of rotation that is updated 706 with each measurement 701. Graph 622 corresponds to a reported accumulated angle of rotation with the assumption that the centre of rotation 606 is known in advance. In other words, the graph 622 corresponds to a reporting 703 when the hard-iron offsets and/or soft-iron effects are immediately taken into account, thus when the device 103 is immediately calibrated, while graph 621 corresponds to the reporting 703 when the centre of rotation is initially determined 705 and updated 706 with each measurement 701. From both graphs 621 and 622, it is thus illustrated that after less than three quarters 624 of a complete turn 625, the calculations are in line with the real-life situation 623.

By considering the accumulated angle of rotation 710, a change in the state may be deduced therefrom. This change in the state may, for example, be calculated 702 by the device 103, such that the state is reported 703 directly, while the accumulated 710 angle of rotation may be reported 703 as well.

The reporting 703 of either directly the state, or a change in the state, is, according to an embodiment, executed by the wireless interface 504. The device 103 thus emits 404 its state or its change in state, which may be collected in a control room. In this control room, states of different valves in an industrial facility are collected. In this way, an operator will have an overview of the industrial processes in the facility.

The device 103 is operated by a battery 503. When the rotatable handle 101 is standing still, thus not rotating 109, the processing unit 500 instructs to set the device 103 in a low-power sleep mode, or in a hibernate mode. Next, when a rotating 109 is detected by the accelerometer 502, it instructs the processing unit 500 to wake up the device 103 such that the measurements 701 by triggering 700 the device 103. After a predefined time period, the device 103 may again be set in a low-power sleep mode.

The device 103 further comprises an inputting means 505. When the device 103 is initially attached to the handle 101, the inputting means 505 may instruct the processing unit 500 to initialize the device 103. For example, the calculated accumulated angle is set at zero, which corresponds, as an illustration, to point 626 is graph 620.

The industrial facility may also be located on a moving platform, such as a boat or drilling platform. When such a platform moves, while at the same time the rotatable handle 101 is not rotated, the device 103 will nevertheless measure a varying magnetic field. To avoid improper conclusions therefrom, a fixed reference beacon may be used, as illustrated FIG. 3.

Figure 3:
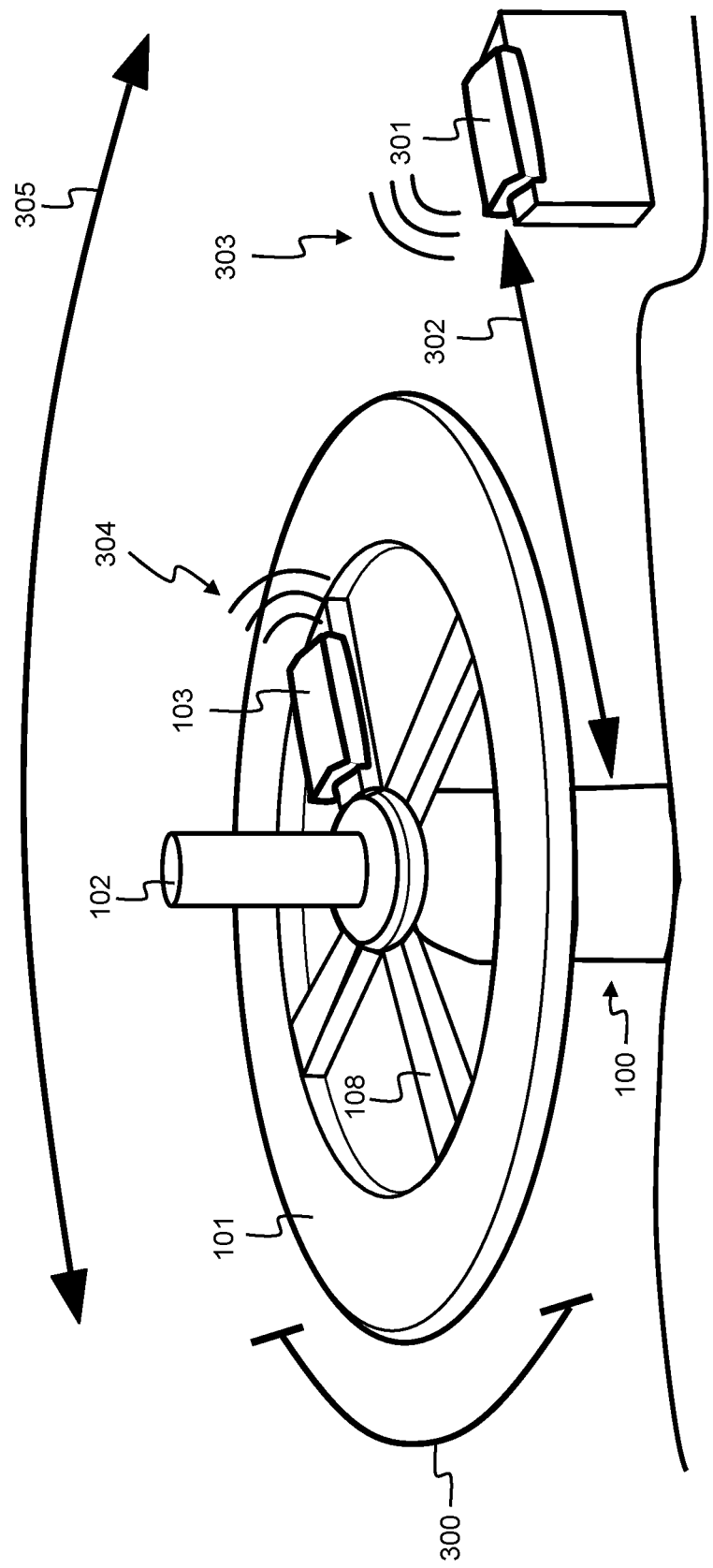
FIG. 3 illustrates a rotatable handle and a fixed reference beacon for monitoring the state of the rotatable handle according to an embodiment of the invention.

In FIG. 3, the rotatable handle 101 is illustrated again, with a fixed reference beacon 301. The fixed reference beacon 301 is located at a fixed distance 302 to the valve 100. When the setting, thus the valve 100 and the beacon 301 moves 305, while the handle 101 is not rotating 300, the device 103 will nevertheless measures a varying magnetic field. Yet, the fixed reference beacon 301 will also measure a varying magnetic field, although it is fixed. This varying magnetic field originates from the movement 305 of the platform. The fixed reference beacon 301 is thus configured to link the movement 305 to the varying field. Next, a reference magnetic field is derived therefrom, and this reference magnetic field is reported 303 to the device 103 which receives 304 it. This way, the device 103 will take into account this reference magnetic field, such that its own measurements are compensated.

Alternatively, instead of using a fixed reference beacon 301, a variety of devices, such as device 103, may be used as well to derive a reference magnetic field. The devices exchange their measurements, such that, based on the measured magnetic fields in the platform, a movement 305 is identified, and subsequently, a reference magnetic field derived therefrom.

Figure 8:
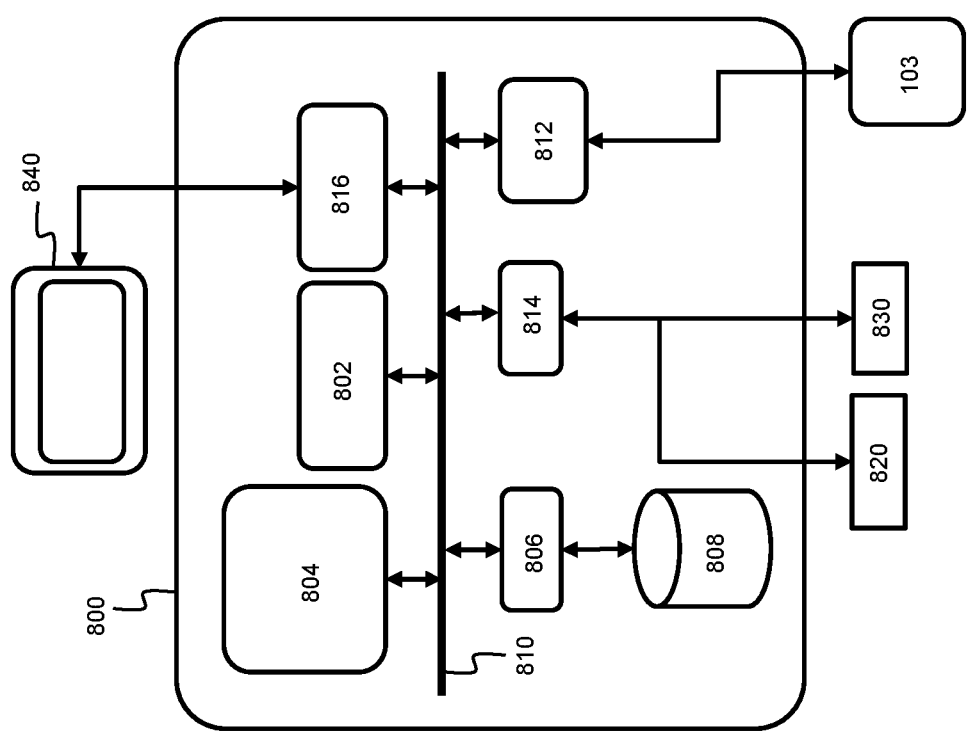
FIG. 8 illustrates a computer system that can be configured to execute one or more embodiments of a method for monitoring a state of a rotatable handle of a valve.

FIG. 8 shows a suitable computing system 800 for performing the steps according to the above embodiments. Computing system 800 may be used as a networking device 102 for monitoring a state of a rotatable handle 101 of a valve 100. Computing system 800 may in general be formed as a suitable general purpose computer and comprise a bus 810, a processor 802, a local memory 804, one or more optional input interfaces 814, one or more optional output interfaces 816, a communication interface 812, a storage element interface 806 and one or more storage elements 808. Bus 810 may comprise one or more conductors that permit communication among the components of the computing system 800. Processor 802 may include any type of conventional processor or microprocessor that interprets and executes programming instructions. Local memory 804 may include a random access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator to input information to the computing device 800, such as a keyboard 820, a mouse 830, a pen, voice recognition and/or biometric mechanisms, etc. Output interface 816 may comprise one or more conventional mechanisms that output information to the operator, such as a display 840, etc. Communication interface 812 may comprise any transceiver-like mechanism such as for example one or more Ethernet interfaces that enables computing system 800 to communicate with other devices and/or systems. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage elements 808 above is described as a local disk, in general any other suitable computer-readable media such as a removable magnetic disk, optical storage media such as a CD or DVD, -ROM disk, solid state drives, flash memory cards, . . . could be used. The system 800 described above can also run as a virtual machine above the physical hardware.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A device configured to monitor a state of a rotatable handle of a valve when the device is attached to the rotatable handle, the device comprising a vector magnetometer configured to measure a magnetic field;
the device further comprising a processing unit configured to:
obtain from the vector magnetometer measurements of the magnetic field when the handle is rotated;
calculate a change in the state of the rotatable handle based on a difference between the measurements of the magnetic field; and
report the change in the state.

2. The device according to claim 1 wherein the calculating of the change further comprises:
calculate an angle of rotation of the rotatable handle between the measurements.

3. The device according to claim 2 wherein the processing unit is further configured to calculate a total angle of rotation from the start to the end of the rotation as the change in the state.

4. The device according to claim 2 wherein the calculating further comprises, when obtaining a new measurement:
determine a new center of rotation of the rotatable handle between the new measurement and a previous measurement;
update a mean center of rotation based on the new center of rotation;
correct the calculated angle of rotation based on the updated mean center of rotation.

5. The device according to claim 4 wherein the calculating further comprises, when obtaining the new measurement:
update an accumulating angle of rotation with the corrected angle of rotation.

6. The device according to claim 5 wherein the total angle of rotation corresponds with the accumulating angle of rotation.

7. The device according to claim 1 further comprising a wireless interface; and
wherein the processing unit is further configured to report the change in the state by the wireless interface.

8. The device according to claim 1 wherein the device further comprises a battery; and
wherein the processing unit is further configured to set the device in a low-power sleep mode when the rotatable handle is not rotated; and
the device further comprising an accelerometer configured to instruct the processing unit to wake up the device when the handle is rotated.

9. The device according to claim 1 further comprising an inputting means configured to manually instruct the processing unit to initialize the state.

10. The device according to claim 1 wherein the processing unit is further configured to:
obtain from a fixed reference beacon measurements of a reference magnetic field; and
wherein the calculating of the change is further compensated by the reference magnetic field.

11. The device according to claim 1 wherein the processing unit is further configured to:
obtain measurements of the magnetic field from at least one other device of claim 1;
derive a reference magnetic field based on the obtained measurements of the device and the at least one other device; and
wherein the calculating of the change is further compensated by the reference magnetic field.

12. A valve comprising:
a rotatable hand; and
a device configured to monitor a state of the rotatable handle,
wherein the device includes a vector magnetometer configured to measure a magnetic field, and
wherein the device further includes a processing unit configured to
obtain from the vector magnetometer measurements of the magnetic field when the handle is rotated;
calculate a change in the state of the rotatable handle based on a difference between the measurements of the magnetic field; and
report the change in the state.

13. A method for monitoring a state of a rotatable handle of a valve, the method comprising the steps of:
obtaining from a device attached to the rotatable handle comprising a vector magnetometer measurements of a magnetic field when the handle is rotated;
calculating a change in the state of the rotatable handle based on a difference between the measurements of the magnetic field; and
reporting the change in the state.

14. A non-transitory computer readable storage medium having stored thereon executable instructions that when executed by one or more processors of a computer system configure the computer system to perform the method according to claim 13.

* * * * *